US 7,644,358 B2

(12) United States Patent
Danninger

(10) Patent No.: US 7,644,358 B2
(45) Date of Patent: Jan. 5, 2010

(54) USABILITY OF A PORTAL APPLICATION

(75) Inventor: Michael Danninger, Landau (DE)

(73) Assignee: SAP AG, Walldorf (DE)

( * ) Notice: Subject to any disclaimer, the term of this patent is extended or adjusted under 35 U.S.C. 154(b) by 301 days.

(21) Appl. No.: 10/979,836

(22) Filed: Nov. 1, 2004

(65) Prior Publication Data
US 2006/0095839 A1 May 4, 2006

(51) Int. Cl.
*G06F 17/00* (2006.01)
(52) U.S. Cl. .................. 715/249; 715/234
(58) Field of Classification Search .......... 715/513, 715/523, 530, 746, 234, 249, 255, 764, 733, 715/854; 707/E17.121
See application file for complete search history.

(56) References Cited
U.S. PATENT DOCUMENTS

| | | | | |
|---|---|---|---|---|
| 6,182,092 | B1 * | 1/2001 | Francis et al. ............... | 715/513 |
| 6,725,426 | B1 * | 4/2004 | Pavlov ........................ | 715/523 |
| 6,738,951 | B1 * | 5/2004 | Weiss et al. ................. | 715/523 |
| 6,816,277 | B2 * | 11/2004 | Kaltenecker et al. ....... | 358/1.15 |
| 6,822,663 | B2 * | 11/2004 | Wang et al. ................. | 715/854 |
| 7,036,076 | B2 * | 4/2006 | Anwar ........................ | 715/530 |
| 2002/0035579 | A1 * | 3/2002 | Wang et al. ................. | 707/513 |
| 2004/0030995 | A1 * | 2/2004 | Bhogal et al. ............... | 715/523 |
| 2004/0098463 | A1 * | 5/2004 | Shen et al. .................. | 709/213 |
| 2004/0181752 | A1 * | 9/2004 | Kinno et al. ................. | 715/513 |
| 2004/0205549 | A1 * | 10/2004 | Yassin et al. ................. | 715/513 |
| 2004/0205562 | A1 * | 10/2004 | Rozek et al. ................. | 715/513 |
| 2004/0205614 | A1 * | 10/2004 | Keswa ......................... | 715/523 |
| 2004/0205616 | A1 * | 10/2004 | Rosenberg et al. ........... | 715/523 |
| 2005/0166143 | A1 * | 7/2005 | Howell ........................ | 715/523 |
| 2005/0262439 | A1 * | 11/2005 | Cameron ..................... | 715/523 |

OTHER PUBLICATIONS

Padova, T.,"Acrobat PDF Bible, (covers Adobe Acrobat 4)", copyright 1999, IDG Books Worldwide, pp. 498-525.*
Tidwell, D., "HTML to Formatting Objects (FO) Conversion Guide", Feb. 1, 2003, IBM Developerworks, downloaded from <http://www-128.ibm.com/developerworks/library/x-xslfo2app/#main>, 37 pages.*
S. Castledine, "DHTML Series—Printing Tabbed Tables", Copyright Oct. 17, 2002, archived Apr. 13, 2003, 5 pages, downloaded from <"http://www.archive.org/web/20030413000725/http://www.projectdx.org/_art16.htm"> (pp. 1-3) and <"http://www.archive.org/web/20030413054256/www.projectdx.org/oct2002.htm"> (pp. 4-5, provided to establish copyright date).*
Yonghyun Hwang; Jihong Kim; Eunkyong Seo, "Structure-aware Web transcoding for mobile devices," Internet Computing, IEEE, vol. 7, No. 5, pp. 14-21, Sep.-Oct. 2003.*
Chrstos, B., Vaggelis, K., Ioannis, M., "Web page fragmentation for personalized portal construction," Information Technology: Coding and Computing, 2004. Proceedings. ITCC 2004. International Conference on vol. 1, 2004 pp. 332-336 vol. 1.*

* cited by examiner

*Primary Examiner*—Doug Hutton
*Assistant Examiner*—James H Blackwell
(74) *Attorney, Agent, or Firm*—Kenyon & Kenyon LLP

(57) ABSTRACT

The present system in one embodiment provides a conversion module that receives and converts webpage documents to an Adobe Acrobat compatible format for further processing. In some embodiments the present system provides and enacts a plurality of conversion rules to convert the webpage so that it may be stored, printed or emailed. In other embodiments the user is further able to customize the conversion rules and select between the plurality of conversion rules used in the document conversion process.

26 Claims, 8 Drawing Sheets

USABILITY OF A PORTAL APPLICATION

TECHNICAL FIELD

The present invention relates to document management using computer interfaces, and more particularly, to a system and methods for converting webpage document formats for the purpose of storing, printing and emailing transportable webpage documents.

BACKGROUND OF THE INVENTION

In recent years, the widespread dependence and the proliferation of computers have led to the development of computer networks. Computer networks allow individual PC's as well as large computer systems to communicate with one another independent of their locations. Network interfaces allow computer systems to send and receive data to and from any network the computer system may be connected to. The Internet is another form of a computer network that has become very popular recently, allowing different users and computers to establish communication with one another.

A user commonly accesses the Internet through a software application known as a web browser. A web browser makes a connection through the Internet to other computers systems, and receives information from the web servers that is then displayed on the individual user's work-station. Information displayed to the user is typically organized into pages that are constructed using a specialized language called Hypertext Markup language or HTML.

While HTML is relatively faster to retrieve and display information on individual work-stations and portal interfaces, the task of printing, storing or emailing the retrieved information does not have an adequate solution.

Typically, HTML documents provide links to other documents in order to help the user obtain further information if necessary. When a user accesses a certain page of the document on the internet, the target page often provide "links" to other pages which are related in some respect to the target page and/or the subject matter of the target page. These "links" are often referred to as "hyperlinks" and the context in which they are presented is referred to as "hypertext". "Hyperlinks" are defined by a word or words, descriptive of the subject matter of the "linked" page and are usually highlighted in some manner to distinguish them over the rest of the text. Hyperlinks can appear in a bold, underscored fashion and/or even in a different color, to allow the user to easily locate them from an otherwise full page of text. A user can then utilize the keyboard or a pointing device such as a mouse, to activate the desired "hyperlink" by placing the cursor at or pointing the mouse to the desired area and activating the "link" by an entering or clicking action.

When searching a particular subject matter, often the first retrieved page only provides the most basic information in a broad manner but other links are provided to retrieve more detailed information. The next "link" level provides more specialized information about the selected topic with other "links" to provide even more detailed information. In this way each "link" level becomes more specialized and more detail oriented. It is not unusual to have to access several links before obtaining a full amount of information necessary about a specific subject matter.

One example is a document that is made up of different sections. The original search retrieves the table of contents, with each section provided as a link. In order for the user to download or print the entire document, each section has to be individually selected, downloading them individually one at a time in sequence and sometimes on a page-by-page basis, each time going through the printing protocol and having to return to the table of contents in order to accomplish the printing or downloading task. This can be a time consuming process, since each time a hyperlink is selected, the entire page will be retrieved including all of the graphics and text and graphics-related parameters specification that is necessary.

In addition to the above problems, the browser printing functionality is unsuitable for printing user portal display content. In portal interfaces, it is common that the display is customized for each computer user based on their specific needs and role within a company. Currently while enacting printing operations, it is not possible to exclude the part of the screen, that is not interesting for the user, e.g. a portal header and a detailed navigation function section. Printing errors frequently occur using the browser printing function, e.g. the output cuffs the content of a page. Additionally, the content may be shown in an unsuitable way, if complex controls like tables or tab strips are used. For example print output may include only the content that is currently shown on the screen. This is not acceptable as users may want to see the whole content of a table or a tab.

The above problems relating to printing documents also are relevant to saving the documents into memory and emailing. In order to save the content of a page e.g. for work reference, the user needs to create a series of screenshots and copy them in a graphical or other appropriate application. In this instance the size of the file may be quite large and the handling of the created document is complicated. For E-Mailing purposes, screen shots need to be copied to a mail client like MS Outlook via a cut and paste operation. The disadvantages of this are that these emails can't be sent directly to a receiver and the E-mail size gets huge very quickly. In order to overcome these obstacles, users need to create zip files or send several E-mails. This again results in cumbersome and time consuming operations for the computer user.

Therefore a fast and convenient way of storing, printing and emailing webpage documents is desired.

SUMMARY

An embodiment of the present invention provides a system and methods for converting, storing, printing and emailing webpages. A webpage is converted to an Adobe Acrobat compatible format by a conversion module provided by the system. The conversion module receives the webpages and the appropriate conversion rules for the conversion process. Once the webpage has been converted it is sent to a browser for delivery to a user computer interface. The user may then store, print or email this transportable document. Other embodiments may allow for a plurality of conversion rules to be created and selected by the user.

In another embodiment of the present invention, the conversion module algorithms and processes are contained in programming code segments that enable the present invention to be used in the computer environment as described herein.

In yet another embodiment, the invention is an apparatus. The apparatus includes a web browser and a set of conversion rules. The apparatus further includes a conversion module to receive webpages from the web browser and convert the webpages based on conversion rules to transportable pages.

In still another embodiment, the invention is a method. The method includes receiving a first set of conversion rules, with the first set of conversion rules specifying default methods of conversion of webpages to transportable pages. The method also includes receiving a second set of conversion rules, with the second set of conversion rules specifying system-defined methods of conversion of webpages to transportable pages. The method further includes receiving a user request to use the first set of conversion rules and the second set of conversion rules. The method also includes converting a webpage to a transportable page using the first set of conversion rules and the second set of conversion rules.

It will be appreciated that the present invention is described below using specific examples that are not intended to limit the invention. The systems and methodology may be applied to a broad range of other computer applications. Therefore these and other advantages of the present invention will become apparent to those skilled in the art upon a reading of the following detailed description and a study of the drawing figures.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION OF THE PREFERRED EMBODIMENT(S)

Figure 1:
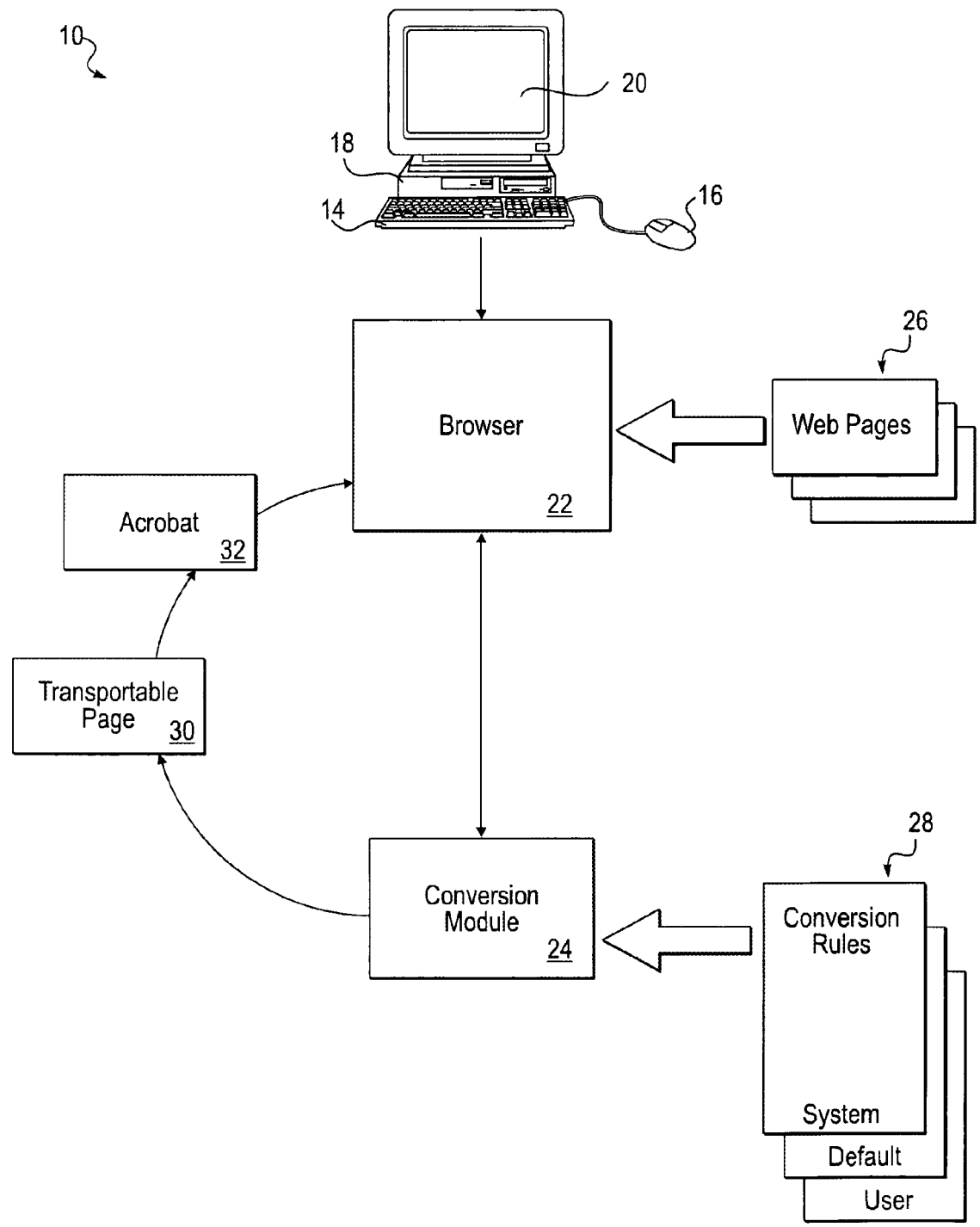
FIG. 1 is a block diagram of a conversion system of an embodiment.

In one embodiment, the present system provides a webpage conversion module that converts webpages to an Adobe format for storing, printing and emailing purposes. The conversion module preferably selects and employs a plurality of rules and algorithms for the conversion process. Various exemplary embodiments of the present system and methods are described below with reference to FIGS. 1-7.

An embodiment of the present invention provides a system and methods for converting, storing, printing and emailing webpages. A webpage is converted to an Adobe Acrobat compatible format by a conversion module provided by the system. The conversion module receives the webpages and the appropriate conversion rules for the conversion process. Once the webpage has been converted it is sent to a browser for delivery to a user computer interface. The user may then store, print or email this transportable document. Other embodiments may allow for a plurality of conversion rules to be created and selected by the user.

In another embodiment of the present invention, the conversion module algorithms and processes are contained in programming code segments that enable the present invention to be used in the computer environment as described herein.

It will be appreciated that the present invention is described below using specific examples that are not intended to limit the invention. The systems and methodology may be applied to a broad range of other computer applications. Therefore these and other advantages of the present invention will become apparent to those skilled in the art upon a reading of the following detailed description and a study of the drawing figures.

FIG. 1 is a schematic diagram of an exemplary conversion system 10. A computer user interacts with the system 10 through a portal interface 20. Each interface 20 contains a display or monitor 12, a keyboard 14, a mouse 16 and a computing unit 18 that contains a microprocessing device for example. The user interacts with and controls the system 10 by inputting data through a keyboard 14 and mouse 16. A plurality of computer interfaces 20, each containing elements 12-18 may be connected to the system. This allows numerous computer users to interact with the system 10. The interface 20 is connected to a browser 22 that provides data to the computer interface 20. Connected to the browser 22 is the conversion module 24. Webpages 26 provided by a computer network or the Internet are provided and available to both the browser 22 and the conversion module 24. The conversion rules 28 are stored in memory and provided to the conversion module 24 to transform the webpages into usable Adobe documents. In this embodiment, the stored rules may be system specific rules, default conversion rules, and user-defined rules. These usable documents referred to as "transportable pages" 30 are then provided to Adobe acrobat 32 and then sent to the browser 22. These transportable pages may then be accessed by the user through the computer interface 20. The conversion module 24 contains program codes wherein the program segments embody the exemplary methods executed to convert the format of the webpages as will be subsequently described.

Figure 2A:
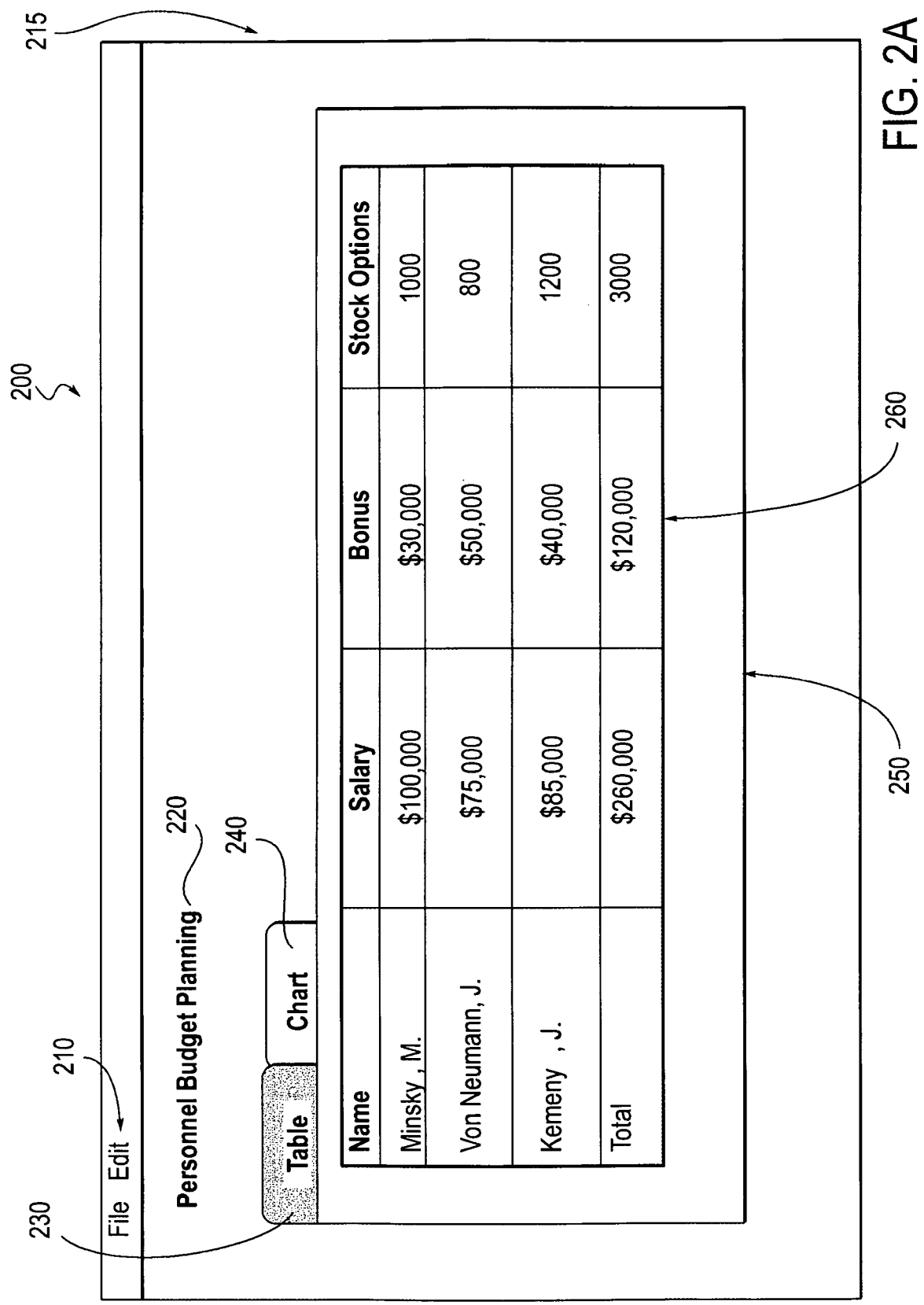
FIG. 2A is an exemplary user interface (display) in an embodiment.
Figure 2B:
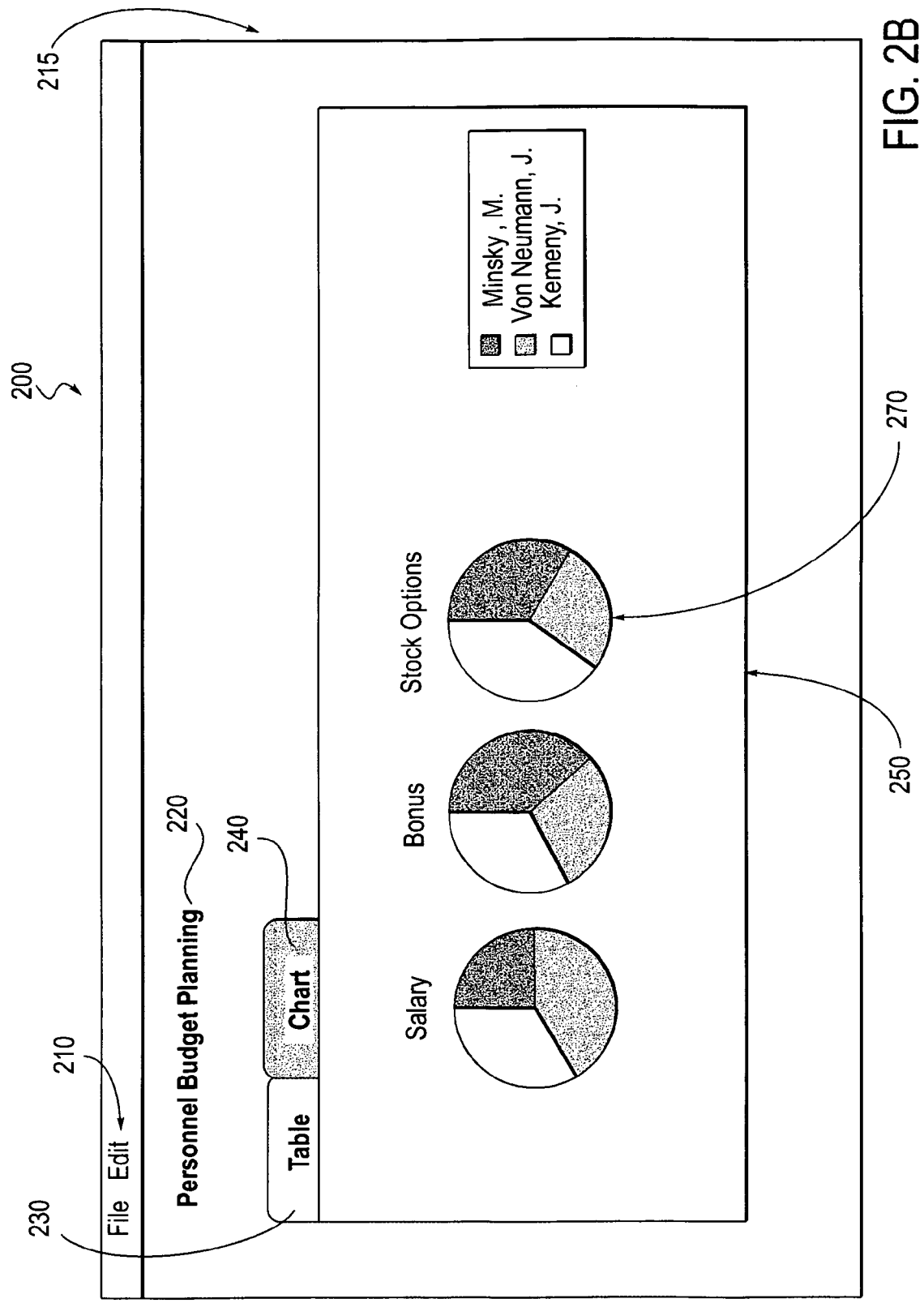
FIG. 2B is the exemplary user interface of FIG. 2A in a different state.

Various interfaces may be used in conjunction with the various embodiments. Illustrated in FIGS. 2A and 2B are exemplary user interface screens, such as may be used in various applications. In FIG. 2A, user interface 200 may be used in a browser, for example. As illustrated, it includes menu bar 210 and display area 215. Display area 215 displays a webpage including title 220, tabs 230 and 240, tab display area 250, and table 260. Tab display area 250 displays information associated with a selected tab. In this illustration, tabs 230 (table) and 240 (chart) are available, with tab 230 selected. As a result, a table of information (260) is displayed. Should a user select tab 240 (chart), the table would be replaced by information in chart form.

The interface screen 200 may contain multiple webpage documents provided by the system to the user's display. The user interface screen 200 may be dependent upon the type of application running, for example an employee in the accounting department may have a different type of interface screen that has features relating to accounting duties. The user interacts with the interface screen 200 through the use of the keyboard 14 and mouse 16 as shown in FIG. 1.

Illustrating a display of information in chart form is FIG. 2B. FIG. 2B also illustrates user interface 200. Again, user interface 200 includes menu bar 210 and display area 215. However, rather than illustrating the table of FIG. 2A, charts 270 (and a corresponding legend) are displayed. This is in response to the selection of the chart tab 240. Note that the charts 270 of FIG. 2B correspond to the data in table 260 of FIG. 2A.

As illustrated, the webpage includes two tabs, a table tab 230 and a chart tab 240. Moreover, this webpage includes information related to compensation for employees, and the table and chart are two options for illustrating this information within the webpage. However, if one wanted to email or print this webpage, browser technology does not allow for printing of the entire set of information on the page. Rather, a printout of a browser display would show either the table tab 230 and associated information, or the chart tab 240 and associated information for example.

Figure 3:
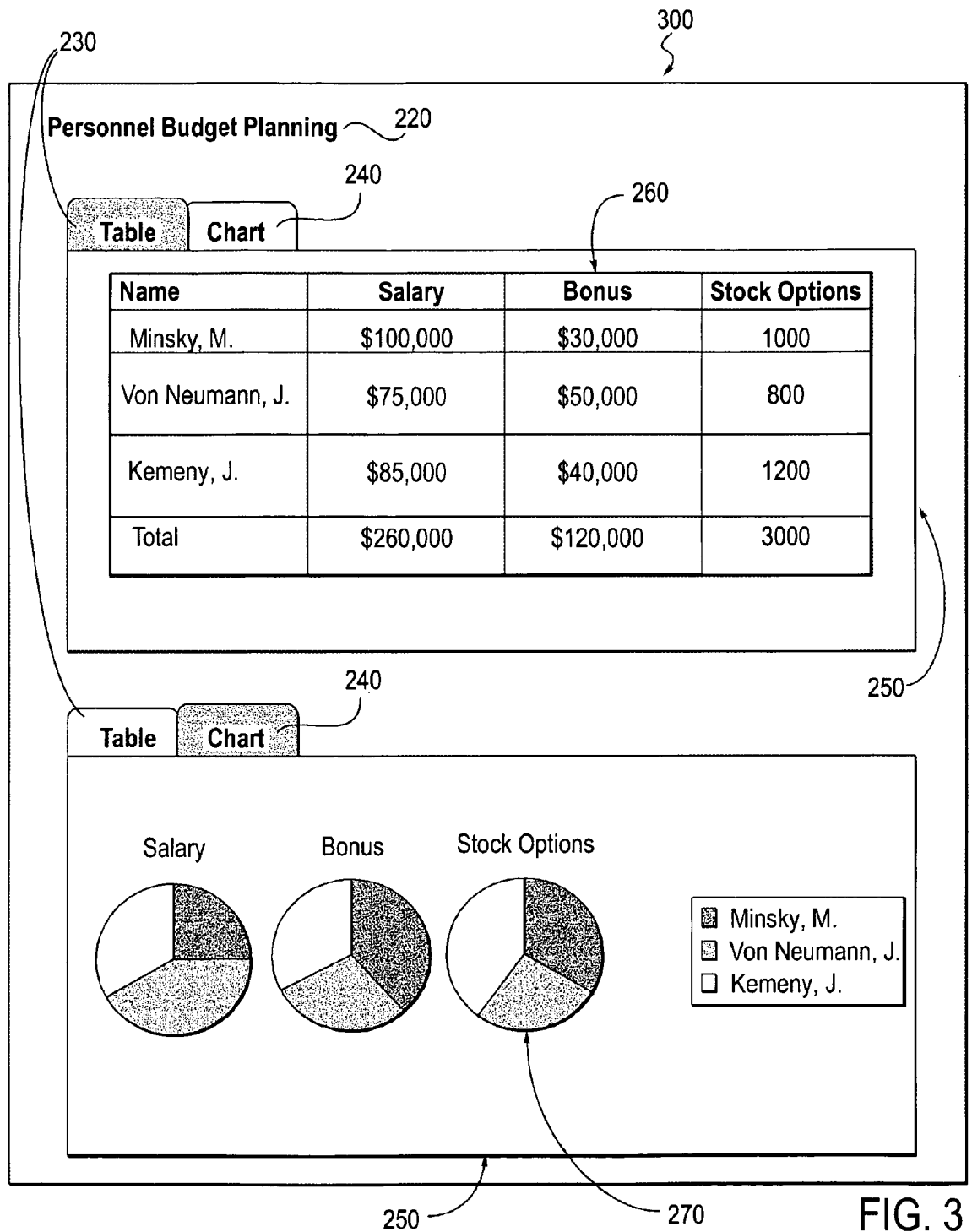
FIG. 3 illustrates a transportable document created in an embodiment.

As an example, the user may desire to create a document relating to the illustrated information. Ideally this transportable document would include all of the information available in the main work screen 200. FIG. 3 shows an illustration of the printed document 300 created from the portal screenshot of FIG. 2. In this example, the pertinent part of the display is converted to an Adobe format document that is easily stored, printed and emailed. As will be subsequently described, the user defined conversion rules are enacted to create this document 300 from the interface screen.

Thus, providing a transportable page that allows for printing, email transport and storage is potentially useful. Turning to FIG. 3, an exemplary illustration of a transportable page is provided. Document 300 is a transportable page including the information of all parts of interface 200. Thus, everything that may appear in display area 215 is provided in document 300. However, the transportable page may be encoded in Adobe forms format, for example. This flexible format allows for device independent formatting of data into a form render-able on essentially all modern computer and data interface video devices.

Document 300 is encoded as a document including all of the information that could be displayed as part of display area 215 of FIGS. 2A and 2B. The conversion of HTML and similar language into an Adobe forms format follows sets of rules as will be discussed further below. However, it should be noted that such rules may dictate how a part of a document is translated, such that tabs may effectively be expanded to show information for all tabs, and selection dropdown menus may either be expanded (showing all data) or fixed to the selected value of the time of use, for example.

Document 300 includes a single instance of title 220. Document 300 also includes a selected table tab 240 along with an unselected chart tab 240 and a corresponding table 260 in the tab display area 250. Document 300 further includes an unselected table tab 230 and a selected chart tab 240 along with corresponding charts 270. By providing both options for selection of tabs 230 and 240, a more accurate picture of the display may be understood. This picture may be used as an email payload, print data, or an archival record of the data therein. When emailed, the document 300 can be used to ease frustration with unclear interfaces, for example. When printed, the document 300 allows further information to be printed without resorting to special print settings. Similarly, when stored, a snapshot of a web browser page is then available for later comparison, for example.

Figure 4:
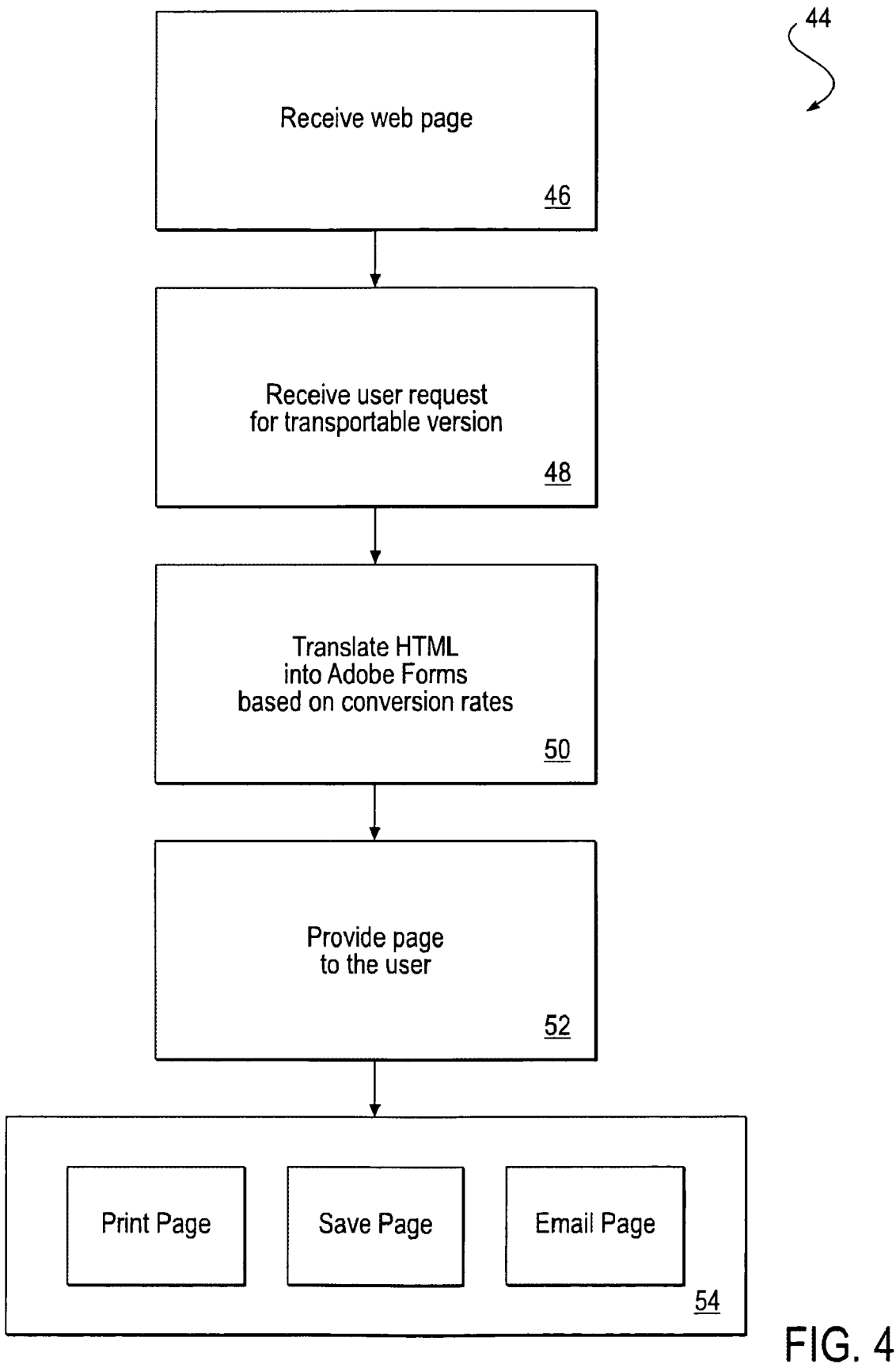
FIG. 4 is a flow diagram illustrating a document conversion process of an embodiment.

Process 44 and other processes may include a set of modules which may be executed in a serial fashion, may be reordered, and may be executed in a parallel fashion. FIG. 4 is a flow diagram illustrating an exemplary process 44 enacted or executed by an embodiment of a conversion module to receive, convert and store webpages. Modules of such processes may be implemented as dedicated hardware or embodied in software for example. The exemplary process starts in module 46 when an HTML webpage is received. The HTML page received would be displayed to a user. In module 48 a user request for a transportable version of the webpage or file is received. This request may be initiated by the user through the interface, so that the transportable version of the HTML page may be stored, printed or emailed. In module 50 the process will convert the HTML page into Adobe format using the conversion rules. The created transportable page is then presented or displayed to the user in module 52. The user is then able to "Print", "Email" and "Save" the transportable page as desired in module 54.

Figure 5:
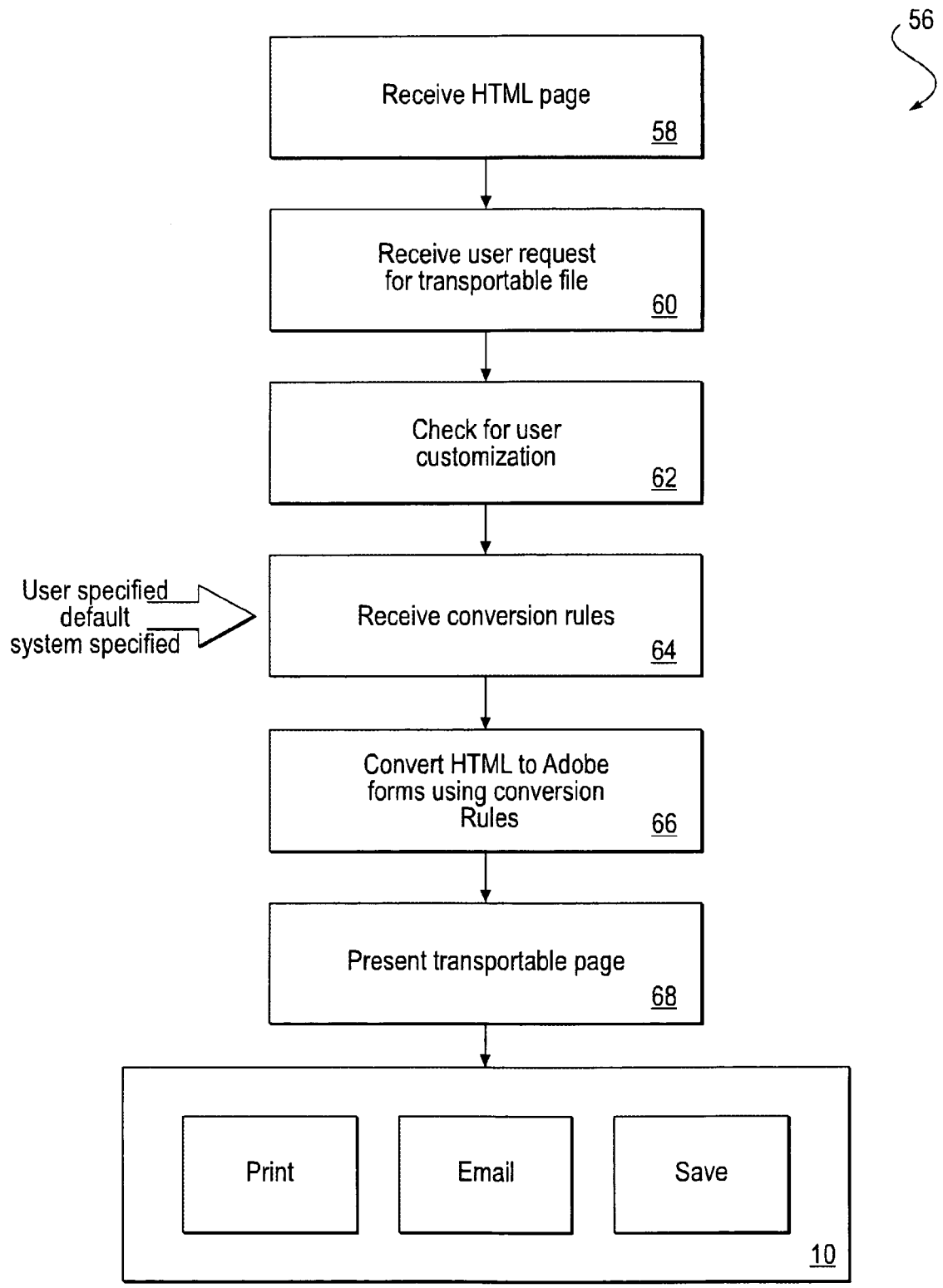
FIG. 5 is a flow diagram illustrating a document conversion process of an embodiment.

Other processes may also be useful for providing transportable pages. FIG. 5 is a flow diagram illustrating another exemplary process 56 executed by the conversion module to receive, convert and store webpages. The exemplary process starts in module 58 when an HTML page is received. The HTML page received may also be displayed to a user. In module 60 a user request for a transportable file is received. This request may be initiated by the user through the interface, so that the HTML page may be made transportable. In module 62 the conversion module checks memory for user customized conversion rules. In module 64 one or more of the three sets of conversion rules are received. The three sets of rules in this embodiment are user-specified rules, default conversion rules, and system specific conversion rules. Once the desired set of rules is received, module 66 will convert the HTML page into Adobe format using the conversion rules. When multiple sets of rules are present, a hierarchical approach to application of the rules may be used. For example, system rules may override user rules and vice versa. The created transportable page is then displayed to the user in module 68. The user may then "Print", "Email" and "Save" the transportable page as desired in step 70.

Figure 6:
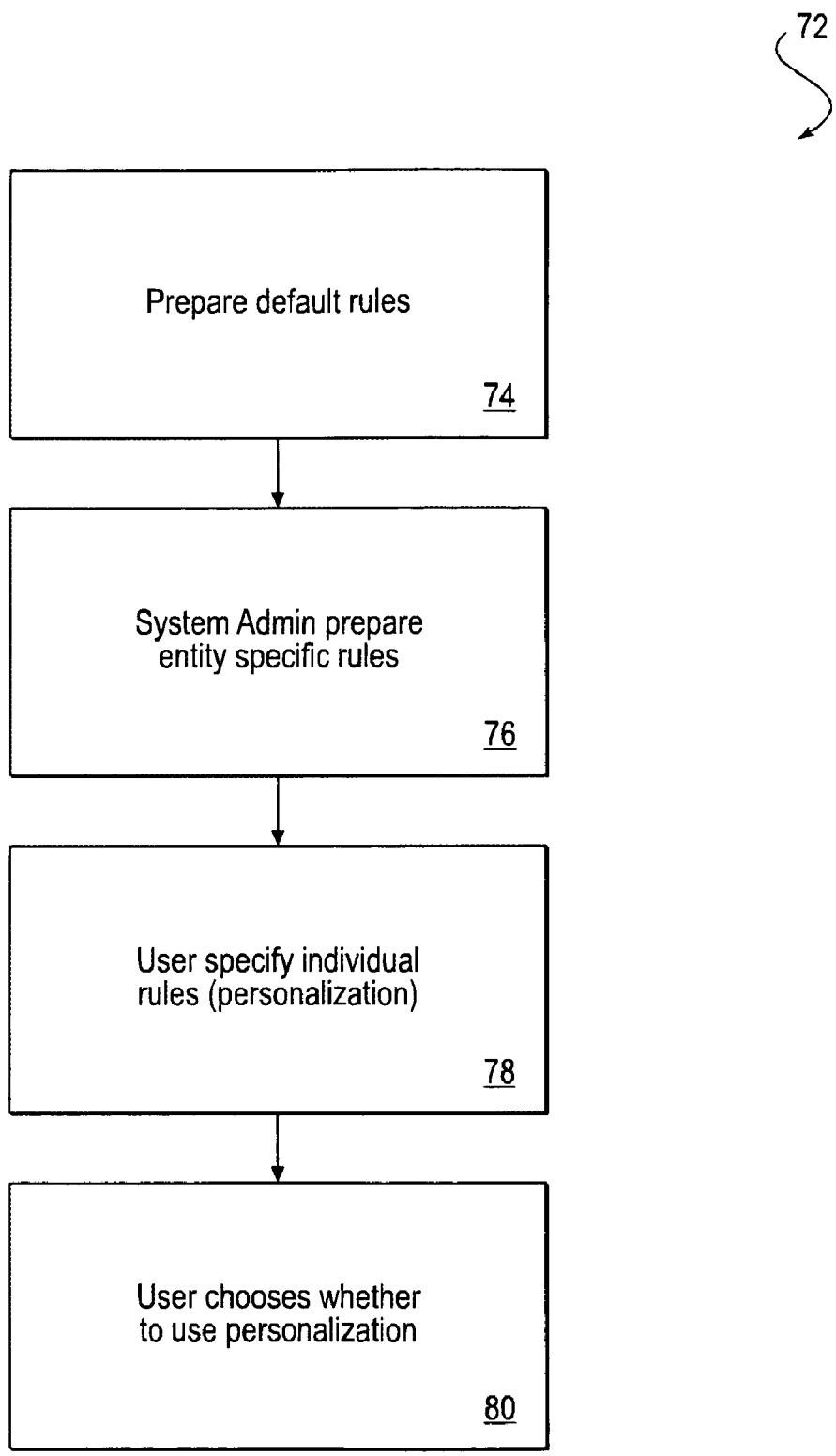
FIG. 6 is a flow diagram illustrating a document conversion process of an embodiment.

FIG. 6 is a flow diagram illustrating another exemplary process 72 executed by the conversion module to receive, convert and store webpage documents. The exemplary process starts in module 74 where the default rules are prepared. In module 76 the system administrator prepares entity specific rules. In module 78 the user may specify individual rules for conversion. In module 80 the user chooses whether to use their personalization rules or the system rules of conversion. As mentioned above, the user is personally aware of system limitations, so the personalized rules entered in module 78 allow for these limitations to be overcome. Moreover, in some embodiments, a user may be able to override default rules or to choose among various options.

An example of conversion rules are shown below in Table 1. In order to create transportable documents based on a variety of scenarios, the administrator or user is able to enter rules specifically designed to meet a variety of needs. For example when the conversion module receives a "Table" code or data-type, all the contents of the table are included in the document, as per the users' customized rules. Conventional systems may only print out the current page of a table. As the user is aware of the deficiencies of system rules, allowing for user personalized rules enables the present system to overcome document difficulties associated with storing, printing and emailing. Alternatively, administrators may specify mandatory or optional rules as appropriate. Table 1 is an example of how specific data types found on the HTML webpages are handled in the transportable document conversion process. Other approaches to handling these data types may also be useful.

TABLE 1

| DATA TYPE | CONVERSION RULES |
| --- | --- |
| Tab Strip | Expand All Tabs |
| Table | Show Whole Table |
| Pick-List | Show Selection |
| Table Linked To Pick-List | Show Selection |
| Edit Boxes | Show Whole Text |

TABLE 1-continued

| DATA TYPE | CONVERSION RULES |
| --- | --- |
| Graphics | Filter Included |
| Tree Control | Show Selection Show Current State |

Figure 7:
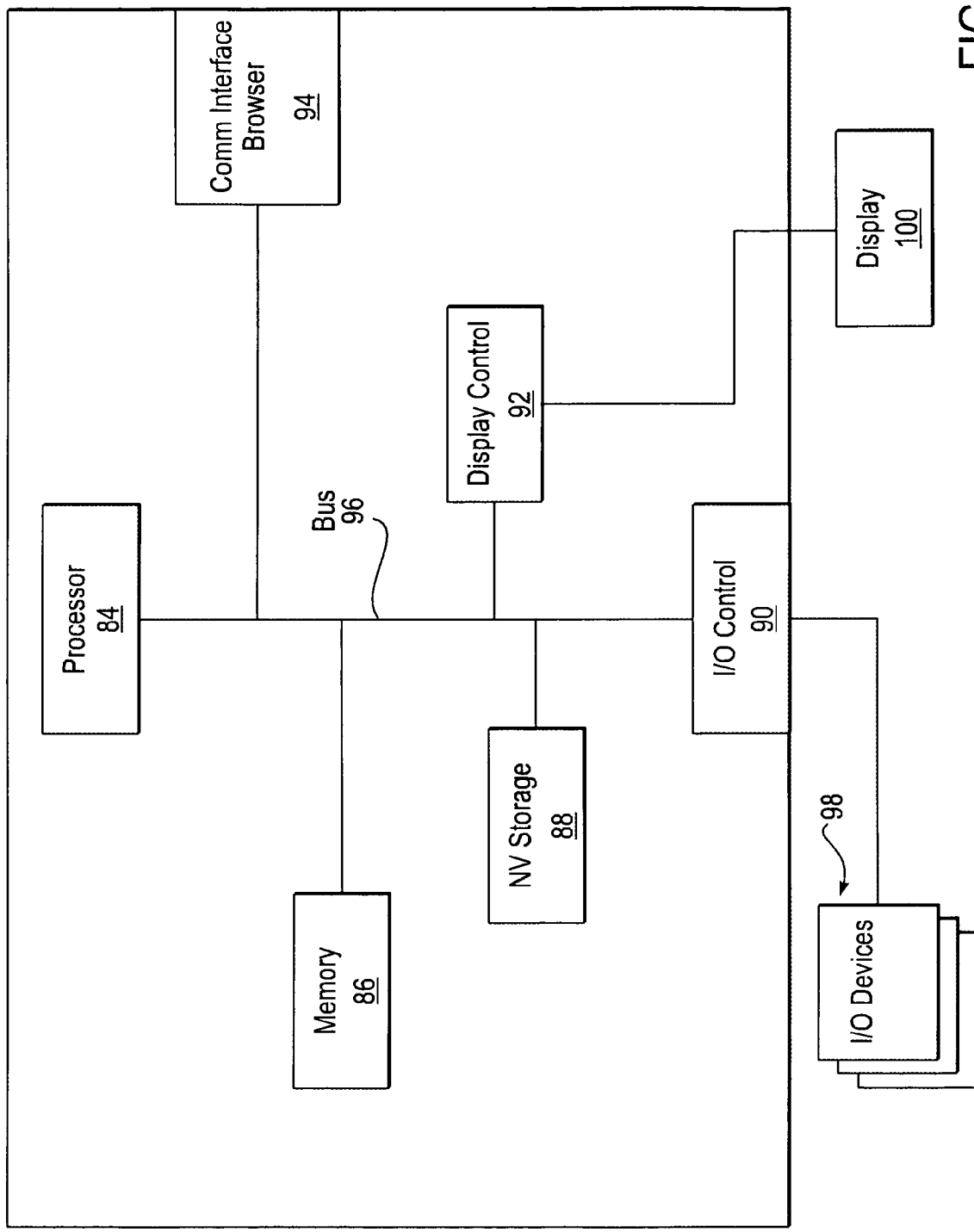
FIG. 7 is a schematic diagram of a document conversion system of another embodiment.

FIG. 7 is a schematic diagram of another embodiment of a transportable document creation and conversion system 82 that provides the means used to support the conversion module and the methods as described above. The computer system 82 may interface to external systems through the browser or network interface 94. It will be appreciated that the browser or network interface 94 can be considered to be part of the computer system 82. This interface 94 may include an analog modem, ISDN modem, cable modem, token ring interface, satellite transmission interface (e.g. "Direct PC"), or other interfaces for coupling a computer system to other computer systems.

The exemplary computer system 82 includes a processor 84, which can be a conventional microprocessor such as an Intel Pentium microprocessor or Motorola Power PC microprocessor. Memory 86 is coupled to the processor 84 by a bus 96. Memory 86 can be dynamic random access memory (DRAM) and can also include static RAM (SRAM). In this embodiment the memory would contain the conversion rules and Abobe Acrobat functions as described above with reference to FIG. 1. The bus 96 couples the processor 84 to the memory 86, to the conversion module 88, to display controller 92, and to the input/output (I/O) controller 90. The processor 84 and the conversion module 88 work together to enable and enact the methods of the present invention. The algorithms and processes of the conversion module would be contained in computer programmed code segments as is conventional.

The display controller 96 controls the display device 100 from instructions received from the processor 84 and the memory 86 to provide the user interfaces and transportable documents to the user. The input/output devices 98 can include a keyboard, disk drives, printers, a scanner, and other input and output devices, including a mouse or other pointing device as shown in FIG. 1. The display controller 98 and the I/O controller 90 can be implemented with conventional well-known technology to provide the customized user interface or portal.

The non-volatile storage of data into memory 86 is often a magnetic hard disk, an optical disk, or another form of storage for large amounts of data. The created transportable documents may be stored into memory 86 during execution of software in the computer system 82. One of skill in the art will immediately recognize that the terms "machine-readable medium" or "computer-readable medium" includes any type of storage device that is accessible by the processor 84 and also encompasses a carrier wave that encodes a data signal.

The exemplary computer system 82 is one example of many possible computer systems that have different architectures. For example, personal computers based on an Intel microprocessor often have multiple buses, one of which can be an input/output (I/O) bus for the peripherals and one that directly connects the processor 84 and the memory 86 (often referred to as a memory bus). The buses are connected together through bridge components that perform any necessary translation due to differing bus protocols.

Network computers do not usually include a hard disk or other mass storage, and the executable programs are loaded from a network connection into the memory 86 for execution by the processor 84. A Web TV system, which is known in the art, is also considered to be a computer system according to this embodiment, but it may lack some of the features shown in FIG. 7 such as certain input or output devices. A typical computer system will usually include at least a processor, memory, and a bus coupling the memory to the processor.

In addition to the algorithms of the present invention, the exemplary computer system 82 is controlled by operating system software that includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the LINUX operating system and its associated file management system. The file management system is typically stored in the memory 86 and causes the processor 84 to execute the various acts required by the operating system to input and output data and to store data in memory, including storing files on the memory 86.

Some portions of the detailed description relating to the conversion module 88 have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to the apparatus for performing the operations herein. This apparatus may be specially constructed for the required purposes, or it may comprise a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Note that Adobe forms and Adobe format have been used throughout the description. Other encoding may be appropriate. Preferably such encoding would provide a self-contained document which need not reference external data.

The algorithms and displays presented herein relating to the conversion module are not inherently related to any particular computer or other apparatus. Various general purpose systems may be used with programs in accordance with the teachings herein, or it may prove convenient to construct more specialized apparatus to perform the required method steps. In addition, the present invention is not described with reference to any particular programming language, and various embodiments may thus be implemented using a variety of programming languages.

One skilled in the art will appreciate that although specific embodiments of the conversion system have been described for purposes of illustration, various modifications can be made without deviating from the spirit and scope of the present invention. For example, embodiments of the present invention may be applied to many different types of computer systems and application programs. Accordingly, the invention is described by the appended claims.

What is claimed is:

1. A method, comprising:
   receiving a request from a user for a transportable version of a web page, said web page displaying content received via a portal interface, said web page displaying a plurality of data types, at least one of the displayed data types displaying content that is visible to the user when the user request is received and including content that is hidden from the user when the user request is received;
   creating the transportable version of the displayed web page based on a set of stored conversion rules, the rules defining how each of the displayed data types on the web page is to be converted and displayed in the transportable version, the transportable version including the visible content and the hidden content; and
   storing the transportable version as a transportable file.

2. The method as recited in claim 1 wherein the set of stored conversion rules contain a set of user specified rules.

3. The method as recited in claim 2 wherein the set of stored conversion rules further contain a set of default rules.

4. The method as recited in claim 3 wherein the set of stored conversion rules further contain a set of system specific rules.

5. The method of claim 4, wherein creating the transportable file comprises applying the set of system specific conversion rules, wherein the set of system specific conversion rules were previously defined by a system administrator.

6. The method as recited in claim 2 wherein the user interactively programs the set of user specified rules.

7. The method as recited in claim 1 wherein the transportable file is converted to Portable Document Format (PDF) format.

8. The method as recited in claim 7 wherein the transportable file is transmitted to a computer interface.

9. The method as recited in claim 8 wherein the transportable file is displayed.

10. The method as recited in claim 8 wherein the transportable file is emailed.

11. The method as recited in claim 8 wherein the transportable file is printed.

12. The method of claim 1, wherein the transportable file includes information provided by all parts of the portal interface.

13. The method of claim 1, wherein the set of stored conversion rules are specific to the user.

14. The method of claim 1, wherein the set of stored conversion rules are specific to the system that generates data displayed by the portal interface.

15. An apparatus comprising:
    a display device,
    a processor executing program instructions representing:
      receiving a request from a user for a transportable version of a web page, said web page displaying content received via a portal interface, said web page displaying a plurality of data types, at least one of the displayed data types displaying content that is visible to the user when the user request is received and including content that is hidden from the user when the user request is received; and
      converting the web page to the transportable version using a set of stored conversion rules defining how each of the displayed data types on the web page is to be converted and displayed in the transportable version, the transportable version including the visible content and the hidden content.

16. The apparatus as recited in claim 15 wherein the set of stored conversion rules includes a set of user specific rules, a set of default rules and a set of system specific rules.

17. The apparatus as recited in claim 16 further comprising a computer interface, wherein the transportable version may be stored as a file, printed or emailed using the computer interface.

18. The apparatus as recited in claim 15 wherein the transportable version is converted into Portable Document Format (PDF) format.

19. A method comprising:
    receiving a request from a user for a transportable version of a web page, said web page displaying content received via a portal interface, said web page displaying a plurality of data types, at least one of the displayed data types displaying content that is visible to the user when the user request is received and including content that is hidden from the user when the user request is received;
    receiving a first set of conversion rules, the first set of conversion rules specifying default methods defining how each data type displayed on the web page is to be converted and displayed in the transportable version;
    receiving a second set of conversion rules, the second set of conversion rules specifying system specific methods defining how each data type displayed on the web page is to be converted and displayed in the transportable version;
    receiving a user request to use the first set of conversion rules or the second set of conversion rules; and
    converting the web page displayed via the portal interface to the transportable version using the user requested first or second sets of conversion rules,
    wherein at least one of the first or second sets of conversion rules includes a rule specifying how the content that is hidden from the user when the user request is received is converted to be included in the transportable file.

20. The method as recited in claim 19 wherein said user request to use the first set of conversion rules or the second set of conversion rules is received from a user interface.

21. The method as recited in claim 20 wherein the first set of conversion rules includes a rule for filtering graphics.

22. The method as recited in claim 19 wherein the transportable version may be stored as a file, printed, or emailed.

23. The method as recited in claim 19 wherein the first set of conversion rules includes a rule for creating transportable version with data tables.

24. The method of claim 19, further comprising:

receiving a third set of conversion rules specifying how each data type displayed on the web page is to be converted and displayed in the transportable version, the third set of conversion rules previously defined by a system administrator; and receiving the user request to use the third set of conversion rules.

25. A method comprising:

receiving a request from a user for a transportable version of a web page, said web page displaying content received via a portal interface, said web page displaying a plurality of data types, at least one of the displayed data types displaying content that is visible to the user when the user request is received and including content that is hidden from the user when the user request is received;

creating the transportable version of the displayed web page based on a set of stored conversion rules defining how each of the displayed data types are to be converted and displayed in the transportable version, the transportable version including the visible content and the hidden content; and storing the transportable version as a transportable file, wherein the data type is a table and the stored set of conversion rules contains a rule that defines whether the entire table or a selected portion of the table is converted and displayed in the transportable file.

26. A method comprising:

receiving a request from a user for a transportable version of a web page, said web page displaying content received via a portal interface, said web page displaying a plurality of data types, at least one of the displayed data types displaying content that is visible to the user when the user request is received and including content that is hidden from the user when the user request is received;

creating the transportable version based on a set of stored conversion rules defining how each of the displayed data types are to be converted and displayed in the transportable version, the transportable version including the visible content and the hidden content; and storing the transportable version as a transportable file, wherein the data type is a graphic and the stored set of conversion rules contains a rule that defines how the graphic is to be converted and displayed in the transportable file.

* * * * *

UNITED STATES PATENT AND TRADEMARK OFFICE
CERTIFICATE OF CORRECTION

PATENT NO.        : 7,644,358 B2                                            Page 1 of 1
APPLICATION NO. : 10/979836
DATED             : January 5, 2010
INVENTOR(S)       : Michael Danninger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this

Sixteenth Day of November, 2010

David J. Kappos
*Director of the United States Patent and Trademark Office*